United States Patent [19]

Minami

[11] Patent Number: 4,751,258

[45] Date of Patent: Jun. 14, 1988

[54] SIZING AGENTS FOR CARBON YARNS

[75] Inventor: Hiroshi Minami, Toyokawa, Japan

[73] Assignee: Takemoto Yushi Kabushiki Kaisha, Aichi, Japan

[21] Appl. No.: 872,099

[22] Filed: Jun. 6, 1986

[51] Int. Cl.[4] .......................... C08K 5/06; C08K 5/10; C08L 63/00
[52] U.S. Cl. .................... 523/414; 523/426; 523/455; 523/456; 428/367; 252/8.9
[58] Field of Search ................. 252/8.9; 523/402, 414, 523/426, 455

[56] References Cited

U.S. PATENT DOCUMENTS

| | | | |
|---|---|---|---|
| 4,107,128 | 8/1978 | Hosoi | 523/434 |
| 4,219,457 | 8/1980 | Taniguchi | 523/427 |
| 4,420,512 | 12/1983 | Ogawa | 523/403 |

Primary Examiner—C. Warren Ivy
Attorney, Agent, or Firm—Flehr, Hohbach, Test, Albritton & Herbert

[57] ABSTRACT

A sizing agent for carbon fibers comprises a water-based dispersion of a mixture of constituents A, B, C and D to be described below at weight ratios of (constituent A)/(constituents B+C)=60/40 to 90/10, (constituent B/constituent C)=2/1 to 7/1, and (constituents A+B+C)/(constituent D)=85/15 to 97/3 where the constituent A is phenyl epoxy resin or aromatic nitrogen-containing epoxy resin, the constituent B is shown by the following expression (I):

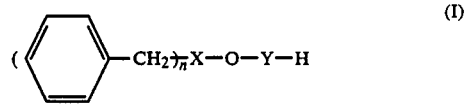

where X is a benzene residue or a diphenyl residue, n is an integer in the range of 1 to 5, Y is

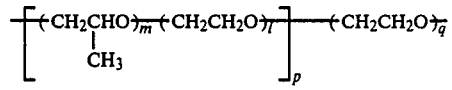

where q is an integer in the range of 4 to 50, p is 0 or an integer in the range of 1 to 5, l and m are such that $\frac{1}{3} \leq m/l \leq \frac{1}{4}$, the constituent C is polyolyethylene alkylphenylether shown by the following expression (II):

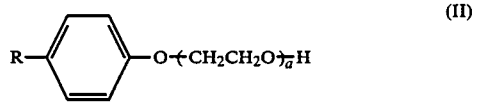

where R is an alkyl group with 8 to 9 carbon atoms and a is an integer in the range of 4 to 8, and the constituent D is aliphatic monovalent alcohol ester of oleic acid and/or monovalent aliphatic acid ester of oleyl alcohol.

2 Claims, No Drawings ns and adhesiveness to the matrix resin but since the coefficient of surface friction is high and the result is extremely poor in lubricity, filament breakages and fluffs occur by all kinds of contacts and frictions between fibers as well as between fibers and a metal during the weaving process prior to the production of prepregsheet. This is because epoxy resins are poor in lubricity and aromatic epoxy compounds, in particular, have very high coefficients of friction such that they are usable acceptably even as adhesives, and also because the aromatic surface active agents which are often used for emulsifying them have the effect of reducing lubricity.

SIZING AGENTS FOR CARBON YARNS

BACKGROUND OF THE INVENTION

This invention relates to sizing agents for carbon fibers and more particularly to water-based emulsion type sizing agents for carbon fibers which are superior in emulsion stability, are capable of wetting carbon fibers well, providing both cohesiveness and smoothness to carbon fibers, and improving workability in wrapping and weaving processes and have no adverse effect on adhesiveness between fibers and matrix resin when a composite material is made.

Carbon fibers are becoming noted for their superior strength, elasticity and heat resistance. Carbon fibers are usually used in the form of filaments but the number of twists per unit length cannot be increased much because they are low in expandability and quickly wear and tear by bending. If the number of twists is increased excessively, unevenness due to fiber bundles appear on the surface and the product becomes less attractive as a compound material. Carbon fibers are therefore treated with a small number of twists during their production and manufacturing processes and this causes many problems such as occurrence of filament breakages, filament defects and fluffs caused by friction against guides and rollers and frequent bending during later processes to lower the filament quality, insufficient wetting of carbon fibers and matrix resin due to fluffs, generation of pores in the product to lower the mechanical strength of the compound material and adverse effects on the work environment due to fluffs.

In view of the problems described above, sizing agents have been used to treat carbon fibers not only to improve their cohesiveness but also to cover and protect the surface of carbon fibers to reduce fluffs and filament breakages and to improve workability. Although various compounds are selected as sizing agent, depending on the matrix resin, use is generally made of epoxy resins, phenol resins, polyimides, polysulfones, etc. dissolved in an organic solvent such as acetone, methylethylketone, ethyl acetate, dichloromethane, etc. and such solutions are applied uniformly. In order to improve productivity of carbon fibers and to speed up and reduce energy consumption in the later manufacturing processes, however, use of highly flammable organic solvents is industrially disadvantageous from the safety and hygenical points of view.

For this reason, water-based emulsion type sizing agents are beginning to be applied recently. If the matrix resin is an epoxy resin, bis phenol A diglycidylethers or aromatic nitrogen-containing compounds are used but epoxy resins are generally hydrophobic and highly viscous such that they cannot easily be made into a stable emulsion. Moreover, although anionic surface active agents with a sodium sulfonate radical are appropriate as a surface active agent which can also be used as an emulsifying agent because of their emulsifying characteristics, it is not desirable to have an alkali metal contained from the point of view of heat resistance characteristics. This means that non-ionic surface active agents should be used as the emulsifying agent but, if an epoxy resin is emulsified only with ordinary non-ionic surface active agent, the long-term stability of the emulsion is generally inferior. If a previously considered water-based epoxy resin emulsion with an epoxy resin and a surface active agent is used to process carbon fibers, there are significant improvements in cohesiveness and adhesiveness to the matrix resin but since the coefficient of surface friction is high and the result is extremely poor in lubricity, filament breakages and fluffs occur by all kinds of contacts and frictions between fibers as well as between fibers and a metal during the weaving process prior to the production of prepregsheet. This is because epoxy resins are poor in lubricity and aromatic epoxy compounds, in particular, have very high coefficients of friction such that they are usable acceptably even as adhesives, and also because the aromatic surface active agents which are often used for emulsifying them have the effect of reducing lubricity.

In view of the above, there have recently been new attempts to improve the lubricity of carbon fibers which have been subjected to a sizing treatment. There has been a report on the use of surface active agents of polyoxyalkylene alkylether and polyoxyalkylene aliphatic acid ether types having a long-chain aliphatic groups for emulsifying and dispersing epoxy resins and another (Japanese Patent Publication Tokko No. 58-43513) on directly using a lubricant such as esters of stearic acid and silicone resins together with a sizing agent. The former method has problems in emulsifying and dispersing epoxy resins, however, while the latter method, although capable of improving lubricity, never fails to adversely affect the adhesiveness to the matrix resin if a lubricant is simply used together.

In summary, there has been no sizing agent for carbon fibers which is satisfactory for practical use from the points of view of adhesiveness, emulsifying and dispersion characteristics, lubricity, etc.

SUMMARY OF THE INVENTION

It is therefore an object of this invention in view of the above to eliminate the disadvantageous characteristics of the prior art sizing agents for carbon fibers.

It is another object of the present invention to provide a water-based emulsion type sizing agent which improves the workability in later processes in the production and manufacturing of carbon fibers.

It is still another object of the present invention to provide a sizing agent for carbon fibers such that carbon fibers processed by this sizing agent has required characteristics regarding cohesiveness, lubricity, adhesiveness to martix resins, etc.

The above and other objects of the present invention are achieved by using specified polyoxyalkylene polybenzyl phenylethers as emulsifier which does not adversely affect the adhesivesness between carbon fibers and matrix resins and also has large affinity to carbon fibers, specified polyoxy alkylphenylether as penetrant, and aliphatic monovalent alcohol ester of oleic acid and/or monovalent aliphatic acid ester of oleyl alcohol as lubricant respectively at a specified ratio with respect to phenol type or aromatic nitrogen-containing type epoxy resins.

DETAILED DESCRIPTION OF THE INVENTION

This invention relates to a sizing agent for carbon fibers comprising a water-based dispersion obtained by mixing effective constituents A, B, C and D to be described below at weight ratios of (constituent A)/(constituents B+C)=60/40 to 90/10, (constituent B/constituent C)=2/1 to 7/1, and (constituents A+B+C)/(constituent D)=85/15 to 97/3 where the constituent A is phenol epoxy resins (typically obtainable from bis phenol or novolac and epichlorohydrin) or aromatic nitrogen-containing epoxy resin, the constituent B is shown by the following expression (I):

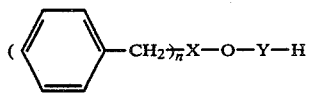   (I)

where X is a benzene residue or a diphenyl residue, n is an integer in the range of 1 to 5, Y is

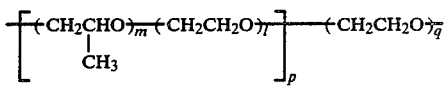

where q is an integer in the range of 4 to 50, p is 0 or an integer in the range of 1 to 5, l and m are such that $1/2 \leq m/l \leq 1/4$, the constituent C is polyoxyethylene alkylphenylether shown by the following expression (II):

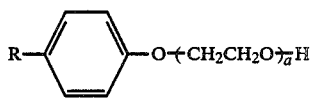   (II)

where R is an alkyl group with 8 to 9 carbon atoms and a is an integer in the range of 4 to 8, and the constituent D is aliphatic monovalent alcohol ester of oleic acid and/or monovalent aliphatic acid ester of oleyl alcohol.

Examples of the constituent A which is indispensable as a component of sizing agents of this invention include aromatic diglycidyl ethers, triglycidyl ethers, polyglycidyl ethers and polyglycidylamines. They may be in the form of a mixture. Examples of diglycidyl ethers include 2,2-bis[p-(2,3-epoxy-propoxy)phenyl]propane and 2,2-bis(2,3-epoxypropoxypheny)methane. Examples of triglycidyl ethers include m-N,N-diglycidyl aminophenyl glycidylether and p-N,N-diglycidyl aminophenyl glycidylether. Examples of polyglycidylethers and polyglycidylamines include novolac-type epoxy compounds and tetraglycidyl(methylene dianiline), etc.

The aforementioned constituent B which is a nonionic emulsifier for emulsifying the constituents A and D includes polyoxyalkylene polybenzyl phenylethers shown by the expression (I). The polyoxyalkylene part of the expression (I) (the part with subscript p) is a random copolymer with molar ratio of propylene oxide (hereinafter abbreviated as PO)/ethylene oxide (hereinafter abbreviated as EO) between 1/2 and 1/4 and this polyoxyalkylene part and the polyoxyethylene part (the part with subscript q) form a block copolymer. The benzylation number n is in the range between 1 and 5. If n is made larger, the compound wets carbon fibers better and its emulsifying characteristics improve also but the preferable range is between 3 and 5. Emulsifiers with large n are preferable against epoxy resins with large molecular weights. If n is made larger, the value of q for the polyoxyethylene part should be increased in order to maintain the hydrophilic balance. When q is increased, the molar ratio m/l for PO/EO should be made larger in order to lower the viscosity of the sizing agent and also to improve the self-dispersion in water. Thus, the values of n, m, l, p and q should be varied within the range described above in connection with the expression (I) in order to adjust the emulsion stability and viscosity according to the type of epoxy resins being used.

The constituent C which is a penetrant is polyoxyethylene alkylphenylether shown by the expression (II) and serves, together with the constituent A which is an emulsion controlling agent, to increase the penetration of the epoxy emulsion into carbon fibers. Desirable results cannot be obtained if the number of carbon atoms in the alkyl group R is less than 8 or larger than 9, or the value of a does not satisfy the relationship $4 \leq a \leq 8$ with respect to the expression (II). Examples of the expression (II) include polyoxyethylene (5 mol) octylphenylether and polyoxyethylene (6 mol) nonylphenylether.

The fourth indispensable constituent D of the present invention is aliphatic monovalent alcohol ester of oleic alcohol and/or monovalent aliphatic acid ester of oleyl alcohol. Esters with a long carbon chain which are a liquid at normal temperatures are generally desirable from the point of view of lubricity while those with a short carbon chain which are a liquid at normal temperatures are generally desirable from the point of view of adhesiveness. Examples of such esters include esters of oleic acid such as oleyl oleate, stearyl oleate, lauryl oleate, octyl oleate, and 2-ethylexyl oleate, isotridecil oleate and esters of oleyl alcohol such as oleyl stearate, oleyl palmitate, oleyl laurate, oleyl isostearate and oleyl octanoate. Oleyl oleate is particularly preferable.

According to the present invention, it is indispensable that the constituent B shown by the expression (I), the constituent C shown by the expression (II) and the constituent D which is an ester compound described above be used with the epoxy resin of the constituent A. The desired effects of the present invention cannot be attained if any of these indispensable constituents is omitted or substituted by another compound. If the constituent B is omitted, emulsion stability of the epoxy resin cannot be achieved. If the constituent C is omitted, the emulsion of sizing agent does not penetrate the bundle of carbon fibers. If the constituent D is omitted, breakages and fluffs will be caused by the friction against guides and rollers during later manufacturing processes of the carbon fibers processed by such a sizing agent.

Equally important according to the present invention are the ratios by which these constituents are mixed together. By weight, the ratio (constituent A)/(constituents B+C) should be between 60/40 and 90/10, and preferably between 70/30 and 80/20, the ratio (constituent B)/(constituent C) should be between 2/1 and 7/1, and preferably between 4/1 and 5/1 and the ratio (constituents A+B+C)/(constituent D) should be between 85/15 and 97/3, and preferably between 90/10 and 95/5. Anticipated effects of this invention cannot be attained if these requirements are not observed. For example, if the (constituent A/(constituents B+C) is less than 60/40, the adhesiveness characteristic between carbon fibers which have undergone a sizing treatment and the matrix resin is adversely affected. If it is greater than 90/10, on the other hand, the long-term stability of the emulsion is affected. If the ratio (constituent B/constituent C) is less than 3/1, the emulsion granule size of the epoxy resin becomes coarse and if it is greater than 7/1, the emulsion granules become fine but the penetration of the emulsion into the carbon fiber bundle becomes weak. If the ratio (constituents A+B+C)/(constituent D) is less than 85/15, the emulsion stability becomes weak and the adhesiveness between processed carbon fibers and matrix resin is adversely affected. If it is greater than 97/3, the processed carbon fibers are insufficient in lubricity, causing filament breakages and fluffs by friction with the guides and rollers and by frequent bending during the later manufacturing processes.

The constituent B of the present invention shown by the expression (I) can be obtained according to a well known method by causing phenol and benzyl chloride to interact in the presence of Lewis acid as catalyst, adding alkylene oxide in the presence of potassium hydroxide as catalyst and filtering after the catalytic processing. To illustrate, an example of constituent B with X representing diphenyl residue, $n=5$, $m=1$, $l=3$, $p=3$ and $q=25$ may be obtained by placing 170 g (1.0 mole) of phenylphenol in a one-liter flask, adding 0.46 g of $ZnCl_2$ as catalyst, dropping 632.5 g (5.0 moles) of benzylchloride thereinto at 110°-125° C. over a period of three hours, adding 5.2 g of KOH after removing HCl which is generated, removing the reaction product into a three-liter autoclave, adding thereto a mixture of 396 g (9.0 moles) of ethylene oxide and 174 g (3.0 moles) of propylene oxide at 140°-160° C., thereafter adding 1100 g (25.0 moles) of ethylene oxide and neutralizing the catalyst. The constituent C shown by the expression (II) can be obtained by adding ethylene oxide to alkyl phenol in the presence of potassium hydroxide as catalyst. The constituent D can be obtained, as is well known, by heating oleic acid and aliphatic monovalent alcohol or oleyl alcohol and monovalent aliphatic acid under a reduced pressure and dehydrating for esterification.

About 0.1 to 3.0 weight %, and preferably about 0.5 to 1.5 weight % of the sizing agent of the present invention should be attached to carbon fibers. In this situation, the concentration of the sizing processing liquid should be preferably between 0.1 and 5.0 weight %. The amount attached to carbon fibers can be adjusted by controlling the squeezing by the rollers after impregnation or the rotational speed of the oiling roller and the concentration of the processing liquid. After the attaching, a heater may be used for drying for a predetermined period of time to complete the sizing treatment.

The sizing agents according to the present invention are particularly effective against carbon fibers from pitchy materials or by heating a precursor of acrylic filaments, eliminating the aforementioned difficulties with the prior art agents and improving workability of carbon fibers in their later manufacturing processes. For example, carbon fibers processed by a sizing agent of this invention have superior cohesiveness and lubricity and do not suffer from filament breakages or fluffs during the wrapping of a tow or during a weaving process when there are frequent contacts with guides and rollers and the fibers undergo frequent bending. This allows high-speed wrapping and weaving of carbon fibers and hence contributes to improve their productivity. Since no organic solvents are required, the agents of the present invention are superior from the points of view of safety and hygiene.

In what follows, the present invention will be explained more in detail by way of examples. Mixing ratios are expressed by weights unless specified otherwise. Testing and evaluation methods are as follows:

(1) Coefficient of friction

Coefficient of friction between fibers was evaluated by wrapping carbon fibers around a cylinder of diameter 5.1 cm and length 7.6 cm, hanging carbon fibers thereon parallel to the direction of wrapping, causing this cylinder to rotate by a load with weight $T_1$ and measuring the tension $T_2$ therein. Coefficient of friction between fibers and a metal surface was measured by the same method except a metal cylinder was used directly. In all situations, the coefficient was calculated by the formula $(1/\pi) \ln (T_2/T_1)$.

(2) Permeation

An emulsion of sizing agent with 2.0% solid component was prepared and a 10 mm square piece of carbon fibers which has not undergone a sizing treatment was spread and placed gently on this liquid surface at 20° C. to measure the time required for this piece to sink.

(3) Fluffs and filament breakages

A rubbing tester produced by Toyo Seikisha was used for testing friction between fibers with a load of 100 g/3000 filaments, internal angle=35°, number of twists=1, distance of rubbing=20 mm, speed=100 times/minutes and frequency of reciprocating motion=500 times. For rubbing tests between fibers and a metal, use was made of a TM type cyarn friction and rubbing tester produced by Daiei Kagaku Seikisha. A metallic comb plated with chromium was moved back and forth 500 times at the speed of 150 times/minute with load of 100 g/3000 filaments, $\theta=150°$, and distance of rubbing=30 mm. For both tests, results were evaluated by the following five-point method:

5: No fluffs, no filament breakage
4: Some fluffs
3: Presence of fluffs
2: Many fluffs, presence of filament breakages
1: Cut (4) Strength of CFRP (to be described below)

The ILSS of obtained CFRP was measured according to D-2344 of ASTM.

(5) Emulsion stability

Emulsions of sizing agents with 20% solid component were prepared and after they were left for seven days at 20° C., their separation conditions were evaluated as follows:

A: No separation
B: Creamy separation floated
C: Precipitation
D: Both creamy separation and precipitation

TEST EXAMPLE 1

Into 70 g of epoxy resin (Epikote 828 produced by Yuka Shell, Inc., obtainable from epichlorohydrin and bis phenol A, having viscosity of 120-150 poise at 25° C., molecular weight of 380 and chemical name of 2,2-bis(p-glycidyloxyphenyl)propane) were mixed 18 g of polyoxyalkylene (PO/EO molar ratio 1/3, 3 mols) polyoxyethylene (25 mols) penta(phenylmethylated) phenylphenylether, 4 g of polyoxyethylene (5 mols) octylphenylether and 8 g of oleyl oleate and heated and dissolved at 80° C. Into this was gradually added 20 g of warm water at 50° to 60° C. with stirring and additional 80 g of the same warm water was added after a phase change to produce an emulsion. Immediately thereafter, it was cooled to 20° C. This emulsion was found to remain stable when left for seven days at 20° C. or 40° C., nor was any separation observed when this emulsion was diluted with water of 20° C. to obtain an emulsion with 1.0% solid component and left for seven days at 20° C. or 40° C. Carbon fibers were soaked in the emulsion of the sizing agent with 10% solid component thus obtained and a sizing treatment was performed thereon by controlling the squeezing such that the same weight of emulsion would attach on these carbon fibers. They were then heated for 20 minutes at 90° C. and then for 10 minutes at 160° C. to obtain a treated sample of carbon fibers.

The carbon fibers thus obtained by a sizing treatment were impregnated with a resin liquid comprising 100 g of Epikote 828, 5 g of boron trifluoride monomethylamine and 25 g of methylethylketone and semi-hardened at 120° C. to produce a unidirected prepreg. There prepreg were stacked inside a mold and after a pressure was added for one hour at 170° C. for formation, the usual method was used for hardening to obtain undirectional carbon fiber reinforcing plastic (herein abbreviated as CFRP) with $V_f=60\%$.

Physical characteristics of the carbon fibers which have undergone sizing treatment and the ILSS of the obtained CFRP are shown in Table 1.

COMPARISON EXAMPLE 1

Carbon fibers were subjected to the same sizing treatment as in Example 1 except that oleyl oleate as lubricant was not contained and CFRP was obtained. The results are shown in Table 1.

COMPARISON EXAMPLE 2

Carbon fibers were subjected to the same sizing treatment as for Example 1 except lauryl ester of stearic acid was used as lubricant instead of oleyl oleate and CFRP was obtained. The results of this case are shown in Table 1.

COMPARISON EXAMPLE 3

Into 76.4 g of Epikote 828 were mixed 18 g of polyoxyalkylene (PO/EO molar ratio 1/3, 4 moles) polyoxyethylene (25 moles) tri(phenylmethylated) phenylphenylether, 4 g of polyoxyethylene (5 moles) octylphenylether and 1.6 g of pure component of silicone resin aminosiloxane produced and sold by Nippon Unicar, Inc. as FZ-119. This aminosiloxane comprises repeating units of dimethylsiloxane and 3-[(2-aminoethyl)amino]propylmethylsiloxane. Its viscosity is 14 poise at 25° C.) and carbon fibers were similarly treated as in Example 1 to obtain CFRP. The results of this case are shown in Table 1.

EXAMPLES 2 THROUGH 8 AND COMPARISON EXAMPLES 4 THROUGH 12

Carbon fibers were treated in the same way as in Example 1 except the sizing agents as shown below were used and CFRP was obtained for each case. The results are shown in Table 2.

EXAMPLE 2

70% mixture Epikote 828/Epikote 1001 at the ratio of 3/1; 15% of polyoxyalkylene (PO/EO molar ratio 1/4, 3 moles) polyoxyethylene (30 moles) penta(phenylmethylated) phenylether; 5% of polyoxyethylene (6 mols) nonylphenylether; and 10% of oleyl palmitate. (Epikote 1001 is an epoxy resin produced by Yuka Shell, Inc. It is obtainable from epichlorohydrin and bisphenyl A. Its melting point is 64°–70° C., and its molecular weight is 900. Its chemical name is 2,2-bis(p-glycidyloxyphenyl)propane homopolymer.)

EXAMPLE 3

70% of mixture Epikote 828/Epikote 1001 at the ratio of 3/1; 15% of polyoxyethylene (PO/EO molar ratio 1/3, 3 moles) polyoxyethylene (45 moles) tetra(-phenylmethylated) phenylphenylether; 5% of polyoxyethylene (5 moles) octylphenylether; and 10% of oleyl oleate.

EXAMPLE 4

85% of mixture Epikote 828/Sumiepoxy ELM-434 at the ratio of 1/1; 9% of polyoxyalkylene (PO/EO molar ratio 1/3, 2 moles) polyoxyethylene (14 moles) tri(-phenylmethylated) phenylether; 3% of polyoxyethylene (5 moles) octylphenylether; and 3% of myristyl oleate. (Sumiepoxy ELM-434 is an epoxy resin produced by Sumitomo Kagaku, Inc. and is tetraglycidyl methylene dianiline obtainable from epichlorohydrin and 4,4'-methylenedianiline, having viscosity of 98 poise at 50° C., molecular weight of 450 and chemical name of N,N,N',N'-tetraglycidyl-4,4'-diaminodiphenylmethane homopolymer.)

EXAMPLE 5

55% of Epikote 828; 27% of polyoxyalkylene (PO/EO molar ratio of 1/2, 4 moles) polyoxyethylene (20 moles) tri(phenylmethylated) phenylether; 8% of polyoxyethylene (4.5 moles) octylphenylether; and 10% of oleyl oleate.

EXAMPLE 6

55% of Epikote 828; 27% of polyoxyalkylene (PO/EO molar ratio of 1/4, 2 moles) polyoxyethylene (11 moles) tribenzyl phenylether; 8% of polyoxyethylene (6.5 moles) nonylphenylether; and 10% of oleyl palmitate.

TABLE 1

|  | Friction | | Fluff, Breakage | | Strength |
|---|---|---|---|---|---|
|  | Fiber-Fiber (18 m/min) | Fiber-Metal (18 m/min) | Rubbing (Point) | TM (Point) | (kg/mm$^2$) (Room Temp.) |
| Example |  |  |  |  |  |
| 1 | 0.208 | 0.202 | 5 | 5 | 7.7 |
| Comparison Example |  |  |  |  |  |
| 1 | 0.252 | 0.290 | 2 | 2 | 7.2 |
| 2 | 0.215 | 0.220 | 4 | 4 | 7.3 |
| 3 | 0.205 | 0.200 | 5 | 4 | 6.8 |

In Table 1, "Friction" means coefficient of kinetic friction at 18 m/min.

As can be understood clearly from the results shown in Table 1, the sizing agent according to this invention shows favorable results regarding emulsion stability, lubricity (coefficient of friction, fluffs and filament breakage) and CFRP strength.

EXAMPLE 7

65% of Sumiepoxy ELM-434; 17% of polyoxyethylene (30 moles) penta(phenylmethylated) phenylether; 5% of polyoxyethylene (6 moles) nonylphenylether; and 13% of oleyl oleate.

EXAMPLE 8

70% of mixture Epikote 828/Epikote 1001 at the ratio of 3/1; 15% of polyoxyalkylene (PO/EO molar ratio of 3/1, 3 moles) polyoxyethylene (45 moles) tetra(-phenylmethylated) phenylphenylether; 5% of polyoxyethylene (5 moles) octylphenylether; and 10% of lauryl oleate.

COMPARISON EXAMPLE 4

60% of Epikote 828; 15% of Epikote 1001; 15% of polyoxyethylene (70 moles) styrenated (5 moles) Cumylphenol; and 10% of oleyl oleate.

COMPARISON EXAMPLE 5

70% of Epikote 828; 23% of polyoxyalkylene (PO/EO molar ratio of 1/3, 2 moles) polyoxyethylene (15 moles) tri(phenylmethylated) phenylether; 5% of polyoxyethylene (6 moles) nonylphenylether; and 2% of oleyl oleate.

COMPARISON EXAMPLE 6

83% of Epikote 828; 4% of polyoxyalkylene (PO/EO molar ratio of 1/2, 3 moles) polyoxyethylene (20 moles) tri(phenylmethylated) phenylether; 3% of polyoxyethylene (6.3 moles) nonylphenylether; and 10% of oleyl palmitate.

COMPARISON EXAMPLE 7

50% of Epikote 828; 30% of polyoxyalkylene (PO/EO molar ratio of 1/3, 3 moles) polyoxyethylene (25 moles) tri(phenylmethylated) phenylether; 10% of polyoxyethylene (5 moles) octylphenylether; and 10% of oleyl oleate.

COMPARISON EXAMPLE 8

83% of mixture Epikote 828/Sumiepoxy ELM-434 at the ratio of 3/1; 5% of polyoxyalkylene (PO/EO molar ratio of 1/3, 2 moles) polyoxyethylene (14 moles) tri(-phenylmethylated) phenyl ether; 2% of polyoxyethylene (5 moles) octylphenylether; and 10% of oleyl oleate.

COMPARISON EXAMPLE 9

66% of Epikote 828; 18% of polyoxyalkylene (PO/EO molar ratio of 1/2, 4 moles) polyoxyethylene (20 moles) tri(phenylmethylated) phenylether; 10% of polyoxyethylene (4.5 moles) octylphenylether; and 4% of lauryl oleate.

COMPARISON EXAMPLE 10

66% of mixture Epikote 828/Epikote 1001 at the ratio of 4/1; 10% of polyoxyalkylene (PO/EO molar ratio of 1/3, 3 moles) polyoxyethylene (40 moles) tetrabenzyl phenylphenylether; 4% of polyoxyethylene (5 moles) pctylphenylether; and 20% of oleyl laurate.

COMPARISON EXAMPLE 11

50% of Epikote 828; 43% of polyoxyalkylene (PO/EO molar ratio of 1/4, 2 moles) polyoxyethylene (11 moles) tri(phenylmethylated) phenylether; 5% of polyoxyethylene (6 moles) nonylphenylether; and 5% of oleyl oleate.

COMPARISON EXAMPLE 12

60% of mixture Epikote 828/Epikote 1001 at the ratio of 4/1; 30% of polyoxyethylene (6 moles) nonylphenylether; and 10% of oleyl oleate.

TABLE 2

| | Emulsion Stability | Permeation (sec) | Friction Fiber-Fiber (18 m/min) | Friction Fiber-Metal (18 m/min) | Fluff, Breakage Rubbing (Point) | Fluff, Breakage TM (Point) | Strength ($kg/mm^2$) (Room Temp.) |
|---|---|---|---|---|---|---|---|
| Examples | | | | | | | |
| 2 | A | 2 | 0.209 | 0.206 | 5 | 5 | 8.0 |
| 3 | A | 2 | 0.210 | 0.210 | 5 | 5 | 8.0 |
| 4 | A | 4 | 0.220 | 0.215 | 4 | 4 | 7.8 |
| 5 | A | 2 | 0.205 | 0.201 | 5 | 5 | 7.7 |
| 6 | A | 2 | 0.210 | 0.213 | 5 | 5 | 7.8 |
| 7 | A | 3 | 0.207 | 0.200 | 5 | 5 | 7.8 |
| 8 | A | 2 | 0.215 | 0.210 | 5 | 4 | 7.5 |
| Comparison Examples | | | | | | | |
| 4 | A | 570 | 0.210 | 0.215 | 3 | 4 | 7.3 |
| 5 | A | 2 | 0.265 | 0.302 | 2 | 2 | 6.8 |
| 6 | C | 210 | 0.225 | 0.230 | 3 | 4 | 7.3 |
| 7 | A | 2 | 0.220 | 0.288 | 4 | 4 | 7.2 |
| 8 | D | 250 | 0.230 | 0.235 | 3 | 4 | 7.3 |
| 9 | A | 2 | 0.267 | 0.300 | 2 | 3 | 7.1 |
| 10 | B | 195 | 0.220 | 0.215 | 4 | 5 | 6.9 |
| 11 | A | 2 | 0.250 | 0.235 | 2 | 3 | 7.1 |
| 12 | D | 2 | 0.262 | 0.280 | 3 | 3 | 7.3 |

In Table 2, "Friction" means coefficient of kinetic friction at 18 m/min.

The results in Table 2 also shows clearly that the sizing agents according to the present invention have superior characteristics regarding emulsion stability, permeation, lubricity (coefficient of friction, fluffs and filament breakage) and the strength of CFRP.

I claim:

1. A sizing agent for carbon fiber comprising a mixture of constituents A, B, C, and D to be described below at weight ratios of (constituent A)/(constituents B+C)=60/40 to 90/10, (constituent B/constituent C)=2/1 to 7/1, and (constituents A+B+C)/(constituent D)=85/15 to 97/3 where said constituent A is epoxy resin or aromatic nitrogen-containing epoxy resin, said constituent B is shown by the following expression (I):

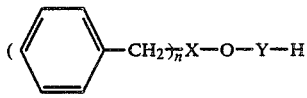 (I)

where X is a benzene residue or diphenyl-residue, n is an integer in the range of 1 to 5, Y is

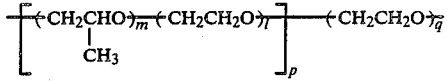

where q is an integer in the range of 4 to 50, p is 0 or an integer in the range of 1 to 5, l and m are such that $1/2 \leq m/l \leq 1/4$, the constituent C is polyoxyethylene alkylphenylether shown by the following expression (II):

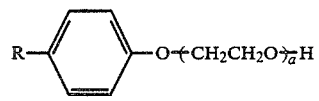 (II)

where R is an alkyl group with 8 to 9 carbon atoms and a is an integer in the range of 4 to 5, and said constituent D is aliphatic monovalent alcohol ester of oleic acid and/or monovalent aliphatic acid ester of oleyl alcohol.

2. The sizing agent of claim 1 wherein said constituent D is oleyl oleate.

* * * * *

UNITED STATES PATENT AND TRADEMARK OFFICE
CERTIFICATE OF CORRECTION

PATENT NO. : 4,751,258                           Page 1 of 2
DATED      : June 14, 1988
INVENTOR(S): Hiroshi Minami It is certified that error appears in the above-identified patent and that said Letters Patent is hereby corrected as shown below:

In the Abstract, the paragraph prior to expression (II), line 2, change "5, 1 and m" to --5, $\ell$ and m--; line 3, change "$\frac{1}{2} \leq m/1 \leq \frac{3}{4}$" to --$\frac{1}{2} \leq m/\ell \leq \frac{3}{4}$--.

Column 3, line 20, change "5, 1 and m" to --5, $\ell$ and m--.

Column 3, line 21, change "$\frac{1}{2} \leq m/1 \leq \frac{3}{4}$" to --$\frac{1}{2} \leq m/\ell \leq \frac{3}{4}$--.

Column 3, about line 64, change m/1 to --m/$\ell$--.

Column 3, about line 67, change "1" to --$\ell$--.

Column 4, about line 58, change (constituent A/-- to --constituent A)/--.

Column 5, line 16, change "1 = 3" to --$\ell$ = 3--.

Column 6, line 10, change "1n" to --$\ell$n--.

Column 8, line 66, change "tribenzyl" to --tri(phenylmethylated)--.

In Table 2, Comparison Example 7, column 5, change "0.288" to --0.228--.

UNITED STATES PATENT AND TRADEMARK OFFICE
CERTIFICATE OF CORRECTION

PATENT NO. : 4,751,258

DATED : June 14, 1988

INVENTOR(S) : Hiroshi Minami

It is certified that error appears in the above-identified patent and that said Letters Patent is hereby corrected as shown below:

Column 11, about line 16, "5, 1 and m" to --5, $\ell$ and m--.

Column 11, about line 17, change "$\frac{1}{2} \leq m/1 \leq \frac{3}{4}$" to --$\frac{1}{2} \leq m/\ell \leq \frac{3}{4}$--.

Signed and Sealed this

Twenty-seventh Day of December, 1988

Attest:

DONALD J. QUIGG

Attesting Officer

Commissioner of Patents and Trademarks